(12) United States Patent
Wilmart et al.

(10) Patent No.: US 10,768,454 B2
(45) Date of Patent: Sep. 8, 2020

(54) ATHERMAL MODULATOR-SWITCH WITH TWO SUPERIMPOSED RINGS

(71) Applicant: COMMISSARIAT À L'ÉNERGIE ATOMIQUE ET AUX ÉNERGIES ALTERNATIVES, Paris (FR)

(72) Inventors: Quentin Wilmart, Grenoble (FR); Karim Hassan, Grenoble (FR); André Myko, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/518,141

(22) Filed: Jul. 22, 2019

(65) Prior Publication Data

US 2020/0033645 A1 Jan. 30, 2020

(30) Foreign Application Priority Data

Jul. 25, 2018 (FR) ...................... 18 56931

(51) Int. Cl.
G02F 1/025 (2006.01)
G02F 1/01 (2006.01)
G02F 1/015 (2006.01)

(52) U.S. Cl.
CPC .............. *G02F 1/025* (2013.01); *G02F 1/015* (2013.01); *G02F 1/0121* (2013.01); *G02F 2203/15* (2013.01)

(58) Field of Classification Search
CPC ................................ G02F 1/0121; G02F 1/025
See application file for complete search history.

(56) References Cited

U.S. PATENT DOCUMENTS

| | | | |
|---|---|---|---|
| 7,583,874 B2 * | 9/2009 | Rakich ............... | B82Y 20/00 359/346 |
| 7,903,909 B2 * | 3/2011 | Popovic ............. | G02B 6/10 385/27 |
| 8,385,698 B2 * | 2/2013 | Morris ............... | G01C 19/721 385/40 |
| 9,207,469 B2 * | 12/2015 | Yang .................. | G02F 1/025 |
| 9,690,122 B2 * | 6/2017 | Kamei ................ | G02F 1/2257 |
| 10,027,089 B2 * | 7/2018 | Liang ................. | G02B 6/29341 |
| 10,133,145 B2 * | 11/2018 | Song .................. | G02B 6/42 |
| 2009/0263078 A1 * | 10/2009 | Hosomi .............. | G02B 6/12004 385/14 |
| 2009/0274187 A1 | 11/2009 | Kudo et al. | |
| 2014/0321848 A1 | 10/2014 | Sekiguchi | |
| 2016/0124145 A1 | 5/2016 | Hassan et al. | |

(Continued)

OTHER PUBLICATIONS

Search Report for French Application No. 1856931 dated Jun. 6, 2019.

(Continued)

*Primary Examiner* — Daniel Petkovsek

(74) *Attorney, Agent, or Firm* — Pearne & Gordon LLP

(57) ABSTRACT

Provided is a device for modulating or switching an optical signal, comprising a first ring waveguide made of a first material with at least one p-n or p-i-n junction, and a second ring waveguide arranged axially opposite the first ring waveguide. The second ring waveguide is made of a second material that has a thermo-optic coefficient lower than the thermo-optic coefficient of the first material. The first ring waveguide is a sub-wavelength network.

10 Claims, 2 Drawing Sheets

(56) References Cited

U.S. PATENT DOCUMENTS

| | | |
|---|---|---|
| 2018/0307118 A1* | 10/2018 | Sciancalepore ......... G02F 1/395 |
| 2018/0335568 A1 | 11/2018 | Hassan et al. |
| 2019/0018197 A1 | 1/2019 | Boutami et al. |
| 2019/0064632 A1 | 2/2019 | Hassan et al. |
| 2019/0094467 A1 | 3/2019 | Hassan et al. |
| 2019/0196109 A1 | 6/2019 | Hassan et al. |
| 2019/0212493 A1 | 7/2019 | Hassan et al. |

OTHER PUBLICATIONS

Solantini, Mohammad et al. "Enabling Arbitrary Wavelength Optical Frequency Combs on Chip" In: Maser & Phonics Reviews, Jan. 1, 2016, vol. 10, No. , pp. 158-162.

Padmaraju, Kishore et al. "Integrated thermal stabilization of a microring modulator" In: Optics Express, Jun. 17, 2013, vol. 21, No. 12, pp. 14342-14350.

Guha, Biswajeet et al. "Athermal silicon microring resonators with titanium oxide cladding" In:Optics Express, Nov. 4, 2013, vol. 21, No. 22, pp. 26557-26563.

\* cited by examiner

ATHERMAL MODULATOR-SWITCH WITH TWO SUPERIMPOSED RINGS

CROSS-REFERENCE TO RELATED APPLICATIONS

This application claims priority from French Patent Application No. 18 56931 filed on Jul. 25, 2018. The content of this application is incorporated herein by reference in its entirety.

TECHNICAL FIELD

The field of the invention is that of optical devices used in photonic and optoelectronic circuits. More specifically, the invention relates to a resonant ring type device used for modulating or switching an optical signal.

PRIOR ART

Devices that produce modulation and switching functions are fundamentally required in any optical communication system. An optical modulator provides the task of printing on a light signal information carried by an electrical signal. Thus, it encodes information initially of electronic type in optical form. An optical switch, or router, is a device that makes it possible to divert an input optical signal towards one of a plurality of possible outports. Thus, it routes a signal according to the expected destination thereof.

Modulators and switches are controlled by an electrical signal. In the case of the modulator, a wave form of the electrical signal must be reproduced on the optical input signal in order to produce a modulated optical output signal. In the case of the routing switch, the electrical signal is used as a control line in order to establish the desired path between the inport and one of the outports.

Some devices may provide said two functions. This is the case, for example, of the Mach-Zehnder interferometer or of the resonant ring-based devices. In photonic circuits, Mach-Zehnder interferometers are generally preferred. The main reason lies in the fact that the operation of rings is much more sensitive to manufacturing defects or to temperature variations.

Although Mach-Zehnder interferometers are therefore generally more reliable, they have the disadvantage of being much less compact than resonant rings. Yet, compactness is a very important parameter since the radiofrequency electrical bandwidth is significantly impacted by the length of the entrance electrodes. And, although there are solutions for adapting the entrance electrodes and for continuing to increase the frequency, said solutions make the control electronics complicated and therefore are not possible in the case of a dense network of switches, for example an optical network-on-chip. Therefore, it is desired to substitute thermally stable resonant rings with Mach-Zehnder interferometers.

A first solution in order to improve the thermal stability of a resonant ring consists of making same athermal in an active manner. The article by Padmaraju et al., Integrated thermal stabilization of a microring modulator, Opt. Exp 2013, thus describes re-directing a portion of the output signal towards a photodiode where the variation of optical power is used to apply a feedback on the ring via a heater and thus stabilise the resonance wavelength of the ring. Said solution is effective but power consuming and more complex than a passive solution (need of a photodiode in the photonic circuit and of a feedback loop in the control electronics).

Another so-called passive solution consists of making the resonant ring athermal without active feedback system. For example, a material with negative thermo-optic index can be used as waveguide cladding material. Guha et al., Athermal silicon microring resonators with titanium oxide cladding, Opt. Exp. 2013 thus reports a reduction of the thermal sensitivity of 0.1 nm/K to 0.03 nm/K by using a $TiO_2$ cladding that has an index shift when exposed to the temperature opposite to that of Si and therefore compensates for same. But said passive solution requires the introduction of an additional material into the manufacturing process and creates significant optical losses.

DESCRIPTION OF THE INVENTION

The aim of the invention is to propose a device for modulating or switching an optical signal of resonant ring type that has a low thermal sensitivity without active feedback system, which is compatible with a standard manufacturing process and the optical losses of which are limited.

To this end, the invention proposes a device for modulating or switching an optical signal comprising a first ring waveguide made of a first material wherein is produced at least one p-n or p-i-n junction. The first ring waveguide is a sub-wavelength network. The device comprises a second ring waveguide arranged axially opposite the first ring waveguide. The second ring waveguide is made of a second material that has a thermo-optic coefficient less than the thermo-optic coefficient of the first material.

Some preferred but non-limiting aspects of said devices are the following:
the first and second ring waveguide are spaced apart from one another;
the first ring waveguide is a rib guide and the second ring waveguide is a strip guide;
the at least one p-n or p-i-n junction is a junction parallel to the light propagation direction in the first ring waveguide;
the at least one p-n or p-i-n junction comprises a plurality of p-n or p-i-n junctions arranged orthogonally to the light propagation direction in the first ring waveguide;
the thermo-optic coefficient of the second material is at least five times smaller than the thermo-optic coefficient of the first material;
the first material is silicon and the second material is silicon nitride;
5% to 10% of the optical signal is confined in the first ring waveguide;
the sub-wavelength network has along the circumference of the first ring waveguide a set of radial slots, the first ring waveguide having at the slots a residual thickness between 50 nm and 100 nm;
it further comprises a first and a second bus waveguide optically coupled to the first ring waveguide, the first bus waveguide including an inport for receiving the optical signal to be modulated or switched and a first outport, the second bus waveguide including a second outport, each of the first and second bus waveguides being made of the second material.

BRIEF DESCRIPTION OF THE DRAWINGS

Other aspects, aims, advantages and features of the invention will become clear upon reading the following detailed description of preferred embodiments of same, given by way of non-limiting example, and made with reference to the appended drawings wherein.

DETAILED DESCRIPTION OF SPECIFIC EMBODIMENTS

Figure 1:
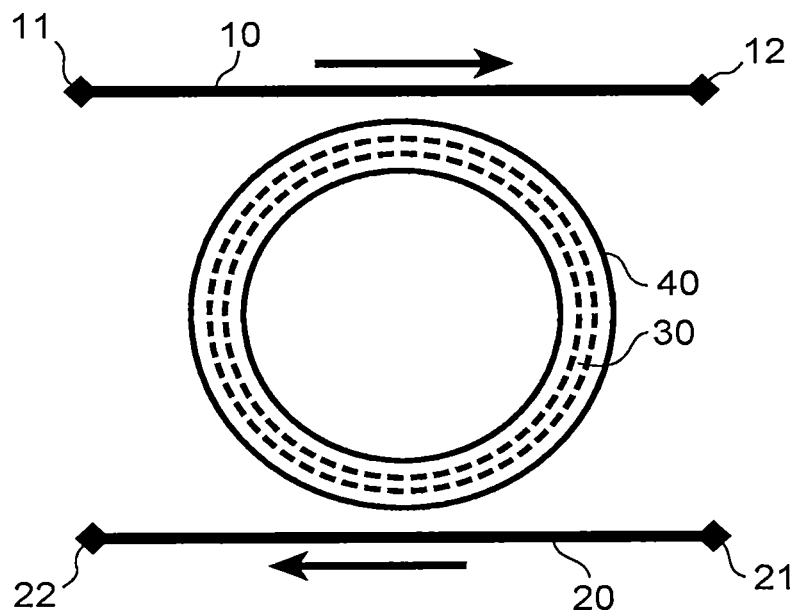
FIG. 1 is a schematic view of a device according to the invention.

With reference to FIG. 1, the invention relates to a device for modulating or switching an optical signal that comprises a first and a second bus waveguide 10, 20 optically coupled to a first ring waveguide 30.

The first bus waveguide 10 includes an inport 11, commonly designated by "In" port, for receiving the optical signal to be modulated or to be switched and an outport 12, commonly designated by "Through" port. The second bus waveguide 20 includes an inport 21, commonly designated by "Add" port, and an outport 22, commonly designated by "Drop" port.

The first ring waveguide 30 has for example a radius of 40 μm. Preferably, it is desired to have a radius as large as possible to increase the quality factor of the device and the modulation/switching effectiveness thereof. But a contrario, said radius is limited due to the maximum frequency of modulation/switching desired. In this regard, the invention may advantageously find application for producing switches for which the switching frequencies must be less than 1 GHz, or even a few hundreds of MHz.

The first ring waveguide 30 is made of a first material wherein is produced, typically by doping, at least one p-n or p-i-n junction. By varying the electric potential at the terminals of said junction, a variation of the concentration of the carriers is created in the resonant cavity which creates a translation of the resonance thereof in the optical spectrum. The first material is typically silicon. The first material may also be germanium or a III-V material.

In the context of a switching application, the variation of the electric potential at the terminals of the junction makes it possible to change the resonant ring:

from an "ON" state where same is resonant with the wavelength of the optical signal received at the "In" port 11 and makes it possible to change said signal from the first bus waveguide 10 to the second bus waveguide 20 where same is found on the "Drop" outport 22;

to an "OFF" state where the resonance frequency thereof is no longer tuned with the wavelength of the optical signal received at the "In" port 11, the optical signal remaining in the same bus waveguide 10 so that same is found on the "Through" outport 12.

The case of the modulation is more generic and implies that the signal available on the "Drop" outport 22 is adjusted to various intermediate levels between "ON" and "OFF", the optical power of the signal to be modulated being for this partially switched between the "Through" and "Drop" outports.

In the context of the invention, the modulation/switching device includes a second ring waveguide 40 arranged axially opposite the first ring waveguide 30. The first and the second ring waveguide are created thus facing each other, i.e. same are arranged opposite one another. The first and the second waveguide are thus superimposed, with or without a space between one another.

Figure 2:
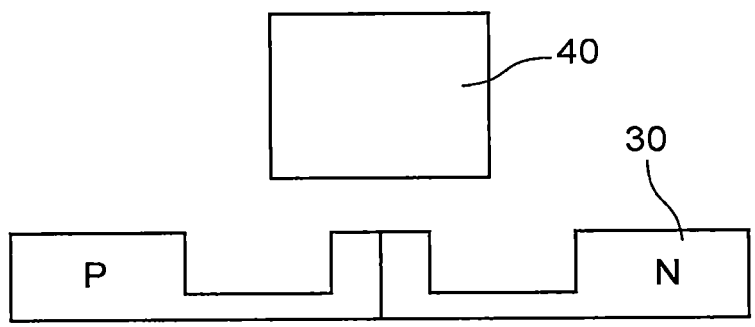
FIG. 2 is a radial cross-sectional view of the first and second ring waveguide of the device according to the invention.
Figure 3:
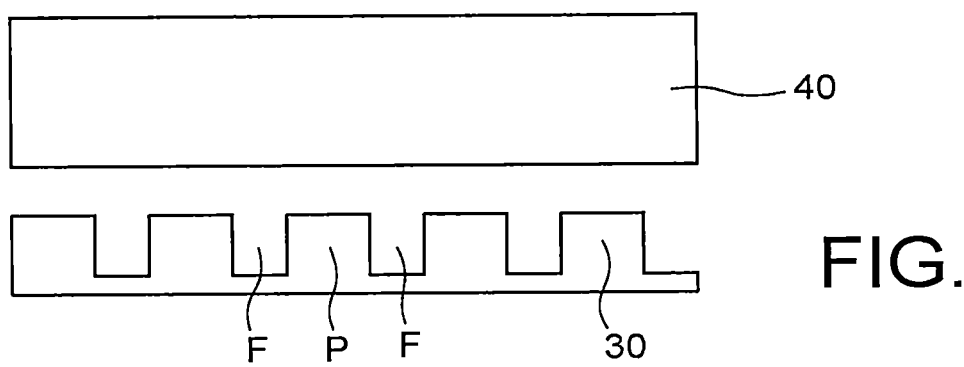
FIG. 3 is a side view of the first and second ring waveguide of the device according to the invention.

It is shown in FIG. 2 a view according to a radial cross-section of said ring waveguides, and in FIG. 3 a side view according to a portion of the circumference of said ring waveguides.

In said figures, the two ring waveguides 30, 40 are spaced apart from one another for example by a distance of 200 nm. The distance separating the two ring waveguides 30, 40 must remain sufficiently short to provide an optical coupling between the two ring waveguides. Said distance is in general less than 400 nm, and in one possible embodiment the two ring waveguides may even be joined to one another. In a photonic stack, the second ring waveguide may be above or below the first ring waveguide.

The dimensions of the second ring waveguide 40 are chosen so as to guarantee a single-mode operation at the operating wavelength, for example at 1310 nm. The second ring waveguide 40 may be a strip guide having for example a width (transversally to the light propagation direction) of 700 nm and a height of 600 nm.

The first ring waveguide 30 may be a rib guide that has for example a central portion of 250 nm of width from an engraving of 250 nm of depth in a waveguide of 300 nm of height.

In FIG. 2, the first ring waveguide 30 has in the central portion thereof a p-n junction parallel to the light propagation direction in the first ring waveguide. Said junction is lateral in FIG. 2, but the invention also extends to a vertical junction. In the same manner, it may be a p-i-n junction.

In an alternative embodiment, the first ring waveguide may have a plurality of p-n or p-i-n junctions arranged orthogonally to the light propagation direction in the first ring waveguide. In said embodiment, interdigital p and n regions are thus found along the circumference of the first ring waveguide.

The second ring waveguide 40 is made of a second material that has a thermo-optic coefficient less than the thermo-optic coefficient of the first material of the first ring waveguide 30. The second material may be SiN, SinO, AlN or be a polymer material such as PMMA (poly(methyl methacrylate)). Preferably, materials are chosen such that the thermo-optic coefficient of the second material is at least five times smaller than the thermo-optic coefficient of the first material. By way of example, the thermo-optic coefficient of a silicon nitride may be $2.10^{-5} K^{-1}$ there where the thermo-optic coefficient of silicon is $2.10^{-4} K^{-1}$, i.e. up to ten times less according to the deposition conditions.

Thus, the invention proposes to introduce into a stack of a photonic platform an additional layer made of a second material less sensitive to the temperature than the material of the first ring waveguide. Said second material may reduce the thermal sensitivity of the modulation/switching device so that it may operate without active feedback system, at the very least for small temperature variations. The bus waveguides 10, 20 may be produced from the second material, and thus be arranged in the layer of the stack where the second ring waveguide is found. Alternatively, same may be produced from the first material, and thus be arranged in the layer of the stack where the first ring waveguide is found. In one alternative embodiment, the bus waveguides may be arranged in a third layer.

Thus, the invention proposes using two layers of different materials to form the two ring waveguides opposite one another, one (the first) providing the active modulation/ switching function and the other (the second) improving the passive properties of the ring. For this the optical signal must have an optical mode distributed on the two ring waveguides 30, 40.

Yet, the second material has an index generally much lower than the first material so that it is difficult to obtain a coupled mode the optical power of which would be distributed on the two ring waveguides. By way of example, for a wavelength of 1310 nm, the index of Si is 3.5 there where the index of SiN is 1.9.

In order to solve said problem, and as is visible in FIG. 3, the invention proposes that the first ring waveguide 30 forms a sub-wavelength network. In such a manner the effective index thereof is close to same of the second ring waveguide 40. By sub-wavelength, it is understood that the pitch of the network is less than $\lambda/2n$ in order to avoid any diffraction effect, with n the effective index of the coupled mode. For an operation at 1310 nm, the period of the sub-wavelength network may be 350 nm.

The reduction of the width of the first ring waveguide also makes it possible to address said problem, it being understood that said width cannot be too small at the risk of making the alignment of the p and n dopings not easily controllable (this would, for example, be the case with a width of 150 nm).

The first ring waveguide therefore has along the circumference thereof a set of radial slots F arranged periodically, two successive slots being separated by a pad P of the first material. The residual thickness of the first ring waveguide at the slots F is preferably between 50 nm (below, the entrance electrical resistance may be too high) and 100 nm (above, a propagation of modes of a slab waveguide may occur).

The width of the pads P (in the light propagation direction) is chosen in view of the limits on the pitch of the network and on the manufacturing possibilities for adjusting the effective index of the first ring waveguide, which will control the distribution of the optical mode between the first ring waveguide 30 and the second ring waveguide 40. The light distribution between the two ring waveguides is therefore essentially set by adjusting the width of the first ring waveguide (transversally to the light propagation direction) and the width of the pads (according to the light propagation direction).

A compromise must be found between a mode mainly in the second ring waveguide 40, therefore not very sensitive to the temperature but with a fairly ineffective modulation/switching and a mode mainly in the first ring waveguide 30, therefore with an effective modulation/switching but sensitive to the temperature.

The first ring waveguide 30 is a resonant device having good quality factors and therefore for which the modulation/switching is particularly effective. Furthermore, the modulation/switching effectiveness may also be improved by increasing the amplitude of the electrical control signal of the modulation/switching. It is therefore possible to promote an optical mode mainly in the second ring waveguide (in order to promote the thermal insensitivity) without affecting the modulation/switching effectiveness. Thus, in one possible embodiment, the distribution of the light between the ring waveguides is such that 5% to 10% of the optical signal is confined in the first ring waveguide.

Thus, the intensity of the coupled mode propagating in the two ring waveguides is in a large part confined in the second ring waveguide. The second material having a low index, the roughness of the walls has less importance and the quality factor of the assembly is increased. The losses induced by the doping of the first material are also reduced. The sub-lambda character of the structuration of the first ring waveguide does not degrade the quality factor. The quality factor being high, the resonance is sharper. Therefore, it is possible to switch over the modulator/switch with a relatively low level of overlap of the mode by the first material.

Figure 4:
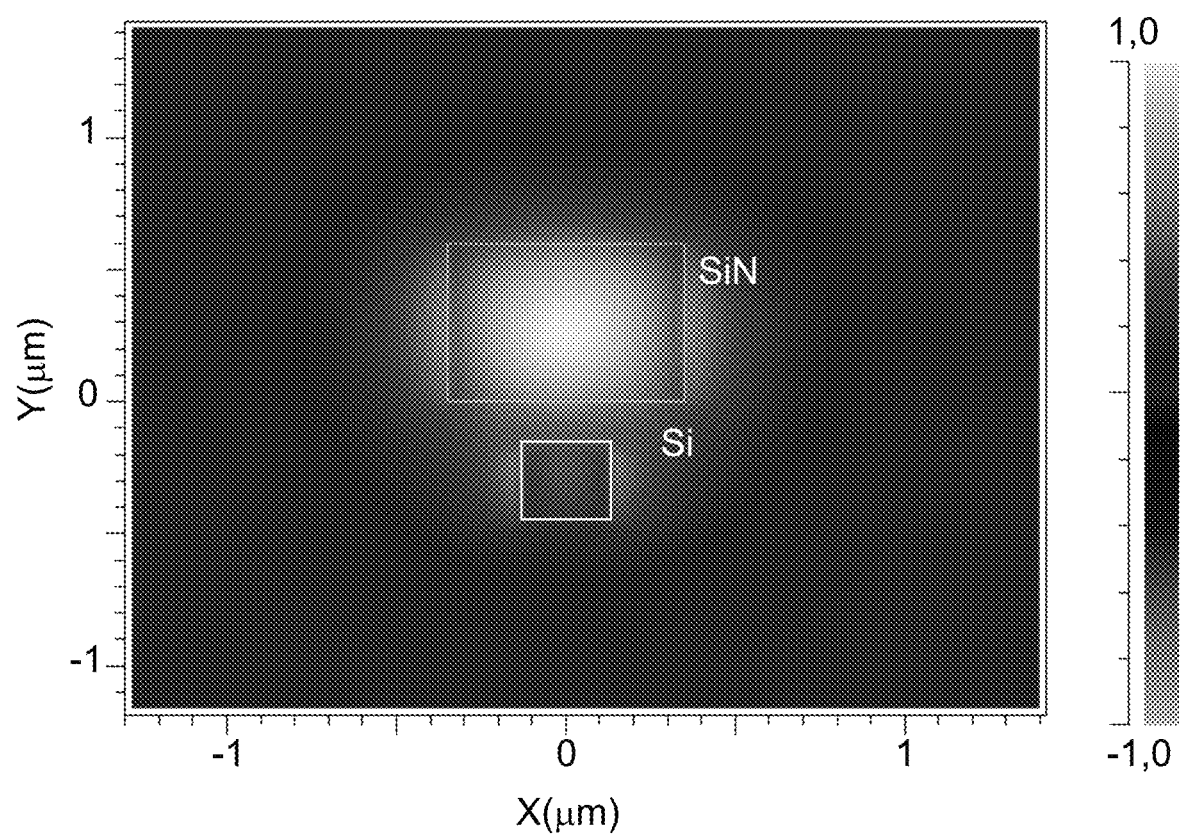
FIG. 4 illustrates the distribution of the optical mode between the two ring waveguides of the device according to the invention.

It is shown in FIG. 4 a simulation of the distribution of the optical mode between the two ring waveguides of the device according to the invention. The first ring waveguide is here a ring of Si, the second ring waveguide is a ring of SiN, said ring waveguides are encapsulated in a cladding made of $SiO_2$ and the dimensions thereof are same exemplified previously. In this example of implementation, only 7% of the light is found confined in the first ring made of silicon and the effective index of the coupled mode is 1.64. By way of comparison, in the absence of the implementation of the invention, in the case of a single ring of silicon, 80% of the light remains confined therein.

The sensitivity to the temperature of the effective index of the coupled mode is given by the following formula:

$$\frac{dn_{eff}}{dT} = \gamma_{Si}\frac{dn_{Si}}{dt} + \gamma_{SiN}\frac{dn_{SiN}}{dt} + \gamma_{SiO2}\frac{dn_{SiO2}}{dt},$$

with the confinement factors $\gamma_{Si}=0.07$, $\gamma_{SiN}=0.57$ and $\gamma_{SiO2}=0.36$ and the thermo-optic coefficients $$\frac{dn_{Si}}{dt} = 2\times10^{-4}K^{-1}, \frac{dn_{SiN}}{dt} = 2\times10^{-5}K^{-1}, \text{ and } \frac{dn_{SiO2}}{dt} = 1\times10^{-5}K^{-1}.$$

Thus, there where the thermal sensitivity in the case of the single ring of silicon is $1.62\times10^{-4}K^{-1}$, same is only $0.29\times10^{-4}K^{-1}$ for the example of embodiment of the invention i.e. almost 6 times less.

A similar reasoning makes it possible to estimate the optical losses that mainly take place in the first waveguide of Si doped. The mode simulation makes it possible to enter the effective imaginary index of the coupled mode $k=3\times10^{-6}$ i.e. a gain of a factor 10 in relation to the case of the single ring of silicon. It will be noted that said estimation only takes into account the effect of the losses associated with the doping in the waveguide made of Si, and that an even higher gain is expected due to the lower sensitivity to the roughness in the SiN waveguide

The invention claimed is:

1. A device for modulating or switching an optical signal, comprising:
    a first ring waveguide made of a first material having a first thermo-optic coefficient, the first ring waveguide being a sub-wavelength network and comprising at least one p-n or p-i-n junction; and
    a second ring waveguide arranged coaxially aligned with the first ring waveguide, the second ring waveguide being made of a second material that has a second thermo-optic coefficient lower than the first thermo-optic coefficient of the first material.

2. The device according to claim 1, wherein the first and the second ring waveguide are spaced apart from one another.

3. The device according to claim 1, wherein the first ring waveguide is a rib guide and the second ring waveguide is a strip guide.

4. The device according to claim 1, wherein the at least one p-n or p-i-n junction is a junction parallel to a light propagation direction in the first ring waveguide.

5. The device according to claim 1, wherein the at least one p-n or p-i-n junction comprises a plurality of p-n or p-i-n junctions arranged orthogonally to a light propagation direction in the first ring waveguide.

6. The device according to claim 1, wherein the second thermo-optic coefficient is at least five times smaller than the first thermo-optic coefficient.

7. The device according to claim 6, wherein the first material is silicon and the second material is silicon nitride.

8. The device according to claim 1, wherein between 5% and 10% of the optical signal is confined in the first ring waveguide.

9. The device according to claim 1, wherein the sub-wavelength network has along a circumference of the first ring waveguide a set of radial slots, the first ring waveguide having at the slots a residual thickness between 50 nm and 100 nm.

10. The device according to claim 1, further comprising a first and a second bus waveguide optically coupled to the first ring waveguide, the first bus waveguide including an inport for receiving the optical signal to be modulated or switched and a first outport, the second bus waveguide including a second outport, each of the first and second bus waveguides being made of the second material.

\* \* \* \* \*